(12) United States Patent
Coleman et al.

(10) Patent No.: US 10,256,940 B2
(45) Date of Patent: *Apr. 9, 2019

(54) SYSTEMS AND METHODS FOR RADIO FREQUENCY HOPPING COMMUNICATIONS JAMMING UTILIZING SOFTWARE DEFINED RADIO PLATFORMS

(71) Applicants: Timothy W. Coleman, Washington, DC (US); Dondon B. Gabriel, Yuma, AZ (US); Boris Kogan, Pelham, NY (US)

(72) Inventors: Timothy W. Coleman, Washington, DC (US); Dondon B. Gabriel, Yuma, AZ (US); Boris Kogan, Pelham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,414

(22) Filed: Aug. 28, 2017

(65) Prior Publication Data

US 2018/0006759 A1 Jan. 4, 2018

Related U.S. Application Data

(63) Continuation of application No. 15/006,100, filed on Jan. 25, 2016, now Pat. No. 9,749,085, which is a continuation of application No. 14/525,068, filed on Oct. 27, 2014, now Pat. No. 9,246,629, which is a continuation of application No. 13/532,235, filed on Jun. 25, 2012, now Pat. No. 8,903,304.

(51) Int. Cl.
*H04K 3/00* (2006.01)
*H04J 11/00* (2006.01)

(52) U.S. Cl.
CPC .............. *H04K 3/42* (2013.01); *H04K 3/43* (2013.01); *H04K 3/44* (2013.01); *H04K 3/45* (2013.01); *H04J 11/00* (2013.01); *H04K 2203/32* (2013.01)

(58) Field of Classification Search
CPC .. H04K 3/42; H04K 3/45; H04K 3/43; H04K 3/41; H04K 2203/16; H04K 3/44; H04K 2203/18; H04J 11/00
See application file for complete search history.

(56) References Cited

U.S. PATENT DOCUMENTS

| | | | | |
|---|---|---|---|---|
| 9,749,085 B2* | 8/2017 | Coleman | ............... | H04K 3/42 |
| 2005/0130653 A1* | 6/2005 | Bisdikian | .......... | H04M 1/72569 |
| | | | | 455/432.3 |
| 2006/0098627 A1* | 5/2006 | Karaoguz | ........... | H04L 12/2856 |
| | | | | 370/352 |

(Continued)

*Primary Examiner* — Nhan T Le
(74) *Attorney, Agent, or Firm* — Rene A. Vazquez, Esq.

(57) ABSTRACT

A dynamically-reconfigurable multiband multiprotocol communications jamming system and method is provided that are particularly suited for the generation of effective radio-frequency waveforms/noise output that successively translates up and down the RF spectrum. The system and method are particularly suited for strategically targeting specific frequencies in order to disrupt a communications network or networks, and can be rapidly deployed via delivery platforms, such as artillery and other projectile mechanisms, remote operated vehicles (unmanned aerial, sea or land systems) or targeted air or land delivery via manned assets or automated or robotic support means, or manual delivery by personnel.

5 Claims, 11 Drawing Sheets

(56) References Cited

U.S. PATENT DOCUMENTS

| | | | | |
|---|---|---|---|---|
| 2008/0032677 A1* | 2/2008 | Catovic | ................ | H04W 72/02 |
| | | | | 455/414.1 |
| 2010/0329162 A1* | 12/2010 | Kadous | ............ | H04W 72/1215 |
| | | | | 370/310 |
| 2012/0256789 A1* | 10/2012 | Bull | ..................... | G01S 5/0221 |
| | | | | 342/357.25 |
| 2017/0250766 A1* | 8/2017 | Dzierwa | ............. | H04B 17/373 |

* cited by examiner

SYSTEMS AND METHODS FOR RADIO FREQUENCY HOPPING COMMUNICATIONS JAMMING UTILIZING SOFTWARE DEFINED RADIO PLATFORMS

This application claims priority to U.S. Provisional Application Ser. No. 61/500,149 filed Jun. 23, 2011, whose entire disclosure is incorporated herein by reference.

BACKGROUND OF THE INVENTION

1. Field of the Invention

The present invention relates communications jamming and, more particularly, to systems and methods for radio frequency hopping communications jamming utilizing software-defined radio platforms.

2. Background of the Related Art

A capabilities gap in the tactical Electronic Warfare realm is the lack of mobile, low-weight tactical jamming capability at the company/platoon/Operational Detachment-Alpha level. Jamming resources are large, limited in number and centralized.

Enemy forces currently use simple communications technology both for both offensive and defensive purposes (fire control, early warning nets, command-and-control, etc.). This technology includes push-to-talk handheld commercial off-the-shelf analog radios in the 2-meter and 70-cm bands. The enemy is able to use these communications nets to effectively adjust fires, coordinate support by fire and the maneuver element, etc. The average commander on the ground has no Electronic Warfare assets immediately available to attack enemy communications, and must rely on centralized airborne assets, which must be coordinated in advance and are available for limited amounts of time.

Historically, the following issues have arisen with prior art tactical ground-based jammers:
(1) Limited Numbers: Jammers have been centralized under a Military Intelligence Company.
(2) Personnel: In the past, Signals Intelligence personnel have performed the jamming mission. Limited in number to begin with, these personnel were split between their collection missions and jamming. An opportunity cost in lost intelligence was thus incurred with every jamming mission, and had to be balanced against the return-on-investment of enemy disruption these missions provided. Due to the classification associated with the Signals Intelligence mission, most commanders on the ground did not have the opportunity to learn how to maximize the utility of jamming.
(3) Large Size: The large size of jammers is primarily due to the size of the power amplifier necessary to perform the historic jamming mission, i.e., attack against a conventional enemy's headquarters. Large size and heavy power consumption have required such jammers to be vehicle-mounted, limiting their use in dismounted operations. Generally, dismounted jammers have failed to effectively suppress enemy networks due to lack of power. This has been an issue of attempting to jam across the entire target band, thereby reducing the jamming power delivered to each channel and necessitating a larger power amplifier to provide adequate jamming coverage to disrupt the target channel. In other words, the approach to jamming enemy communications in the 2-meter band (144-148 MHZ) has involved jamming across the entire bandwidth, and splitting jamming power between 200 distinct 20 KHZ channels. A lot of power is required to do this successfully.

SUMMARY OF THE INVENTION

An object of the invention is to solve at least the above problems and/or disadvantages and to provide at least the advantages described hereinafter.

Therefore, an object of the present invention is to provide a radio frequency hopping communications jammer.

Another object of the present invention is to provide a radio frequency hopping communications jammer that utilizes a software-defined radio system.

Another object of the present invention is to provide a system and method for jamming multiple communications signals at different frequencies by rapidly cycling between the different frequencies.

Another object of the present invention is to provide a system and method for jamming multiple communications signals at different frequencies by rapidly cycling between the different frequencies with a dwell time that is selectable by an operator.

Another object of the present invention is to provide a system and method for jamming multiple communications signals at different frequencies by cyclically generating a jamming signal for each communications signal.

Another object of the present invention is to provide a system and method for jamming multiple communications signals at different frequencies by cyclically generating a jamming signal for each communications signal, where each jamming signal is adapted to dynamically modify its respective communications signal in order to generate a false positive at the target receiver.

Another object of the present invention is to provide a system and method for jamming multiple communications signals at different frequencies by cyclically generating a jamming signal for each communications signal, wherein the jamming signal parameters are adjustable by an operator.

Another object of the present invention is to provide a system and method for jamming multiple communications signals at different frequencies by cyclically generating a jamming signal for each communications signal, wherein the jamming signal waveform and jamming signal bandwidth are adjustable by an operator.

Another object of the present invention is to provide a system and method for jamming multiple communications signals at different frequencies by cyclically generating a jamming signal for each communications signal, wherein the jamming signal is directional.

Another object of the present invention is to provide a system for jamming multiple communications signals at different frequencies by cyclically generating a jamming signal for each communications signal, wherein the system includes a graphical user interface.

Another object of the present invention is to provide a battery powered and portable system for jamming multiple communications signals at different frequencies by cyclically generating a jamming signal for each communications signal.

Another object of the present invention is to provide an electronic warfare system that includes a communications jammer that is capable of jamming multiple communications signals at different frequencies by cyclically generating a jamming signal for each communications signal, wherein the system includes a metamaterial-based antenna system a graphical user interface and a power management system.

Another object of the present invention is to provide a system and method for jamming multiple communications signals at different frequencies by jamming multiple frequencies simultaneously within a predetermined portion of a RF band and rapidly cycling between different RF bands.

Another object of the present invention is to provide a system and method for jamming multiple communications signals at different frequencies by jamming multiple frequencies simultaneously within a predetermined RF band and rapidly cycling between the different RF bands with a dwell time that is selectable by an operator.

Another object of the present invention is to provide a system and method for dynamically generating a set of jamming signals at target frequencies in a predetermined portion of RF band, and then translating up and down a large portion of the RF spectrum based on software-defined radio technologies.

To achieve at least the above objects, in whole or in part, there is provided a communications jamming system, comprising a software defined radio (SDR) system for generating a jamming signal, a processing system in communication with the SDR system, wherein the processing system comprises a host processor for running software used to control the SDR system, and a content management system (CMS) database that contains specifications of known target signals of interest, and a transmit antenna system for transmitting the jamming signal.

To achieve at least the above objects, in whole or in part, there is also provided a method of jamming a communications signal, comprising detecting potential target signals over an RF spectrum, inputting the potential target signals into a processing system, wherein the processing system comprises a content management system (CMS) database that contains specifications of known target signals of interest, determining which of the potential targets signals are hostile target signals, generating a first set of jamming signals for hostile target signals that fall within a first portion of the RF spectrum using a software defined radio system under the control of the processing system, transmitting the first set of jamming signals, generating a second set of jamming signals for hostile target signals that fall within a second portion of the RF spectrum using the software defined radio system under the control of the processing system, and transmitting the second set of jamming signals.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
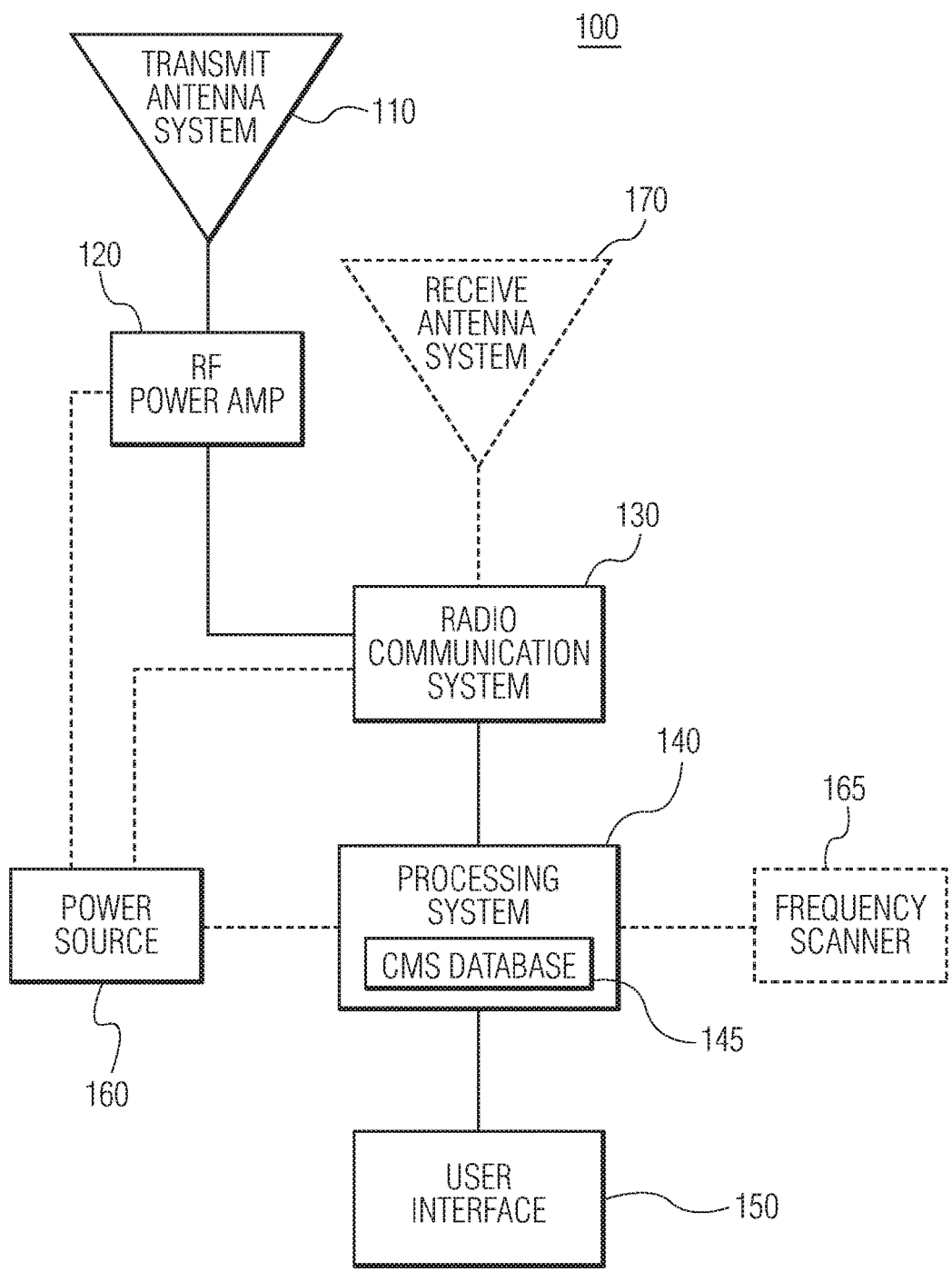
FIG. 1 is block diagram of a communications jamming system, in accordance with one preferred embodiment of the present invention.

The present invention is directed to systems, devices and methods for an unmanned and man-portable electronic warfare system for frequency-hopping communications jamming, and more particularly for the generation of radio-frequency noise/output through a series of frequencies cyclically in order to dynamically modify or disrupt a communications network or networks.

Prior art systems typically address multiple target signals by attempting to jam all target frequencies at once, which requires splitting the available transmitter power into multiple jamming channels. This lowers the effective power delivered to each target frequency. Alternatively, prior art systems may generate a jamming signal across a band of frequencies ("barrage jamming"), which likewise reduces the jamming power delivered to each target frequency. In addition, many prior art systems attempt to jam target frequencies by transmitting random or distributed noise over the target frequencies in order to oversaturate or overwhelm the target receiver. These types of jamming signals can be neutralized by known countermeasure techniques, such as bandpass filters, low-noise amplifiers, automatic gain control, low-pass filters.

In contrast, the present invention dynamically generates a set of jamming signals at target frequencies in a predetermined portion of a radio frequency band, and then translates up and down a large portion of the RF spectrum based on software-defined radio technologies. The present invention provides a dynamically-reconfigurable multiband multiprotocol communications jamming system, that is particularly suited for the generation of effective radio-frequency waveforms/noise output that successively translates up and down the RF spectrum (usually a few Gigahertz wide). The present invention is particularly suited for strategically targeting specific frequencies in order to disrupt a communications network or networks, and can be rapidly deployed via delivery platforms, such as artillery and other projectile mechanisms, remote operated vehicles (unmanned aerial, sea or land systems) or targeted air or land delivery via manned assets or automated or robotic support means, or manual delivery by personnel.

Two primary elements of the present invention include the generation of an RF spectrum with multiple signal generation per band, and a multiband multi-waveform underlying logic to achieve communications and data jamming Specifically, the present invention is designed to leverage digital signal processing and complex numerical theory to mathematically model all transmitted waveforms and strategies for effective jamming in various frequency bands and environmental conditions. Thus, the present invention has the embedded capability to anticipate and or predict the best jamming solution for each situation or scenario as prescribed by the functional parameters set forth by the operator.

As a closed-loop system, the present invention requires feedback from sensors continuously (or at high samples per second) in order to adjust to moving targets. Sensor readings from RF detectors, temperature sensors, relative humidity, etc. are used to dynamically tune the entire RF front-end for precision target jamming.

Another feature of the present invention is the ability to adapt on the fly and customize waveform types to specific channels or target frequencies for the most desired effects or "perceived" by the operator of the target receivers. The present invention creates a new type of cognitive radio and communications jamming capability for an intelligent, anticipatory system for electronic warfare and signals jammers.

In addition, the present invention can be adapted to address multiple target frequencies by rapidly addressing each target frequency in a cyclical manner. In this mode, because only one target frequency is being addressed at any given time, the present invention is able to deliver a jamming signal on each target frequency at full output power, rather than having to split the available output power over several target frequencies at one time. Because the present invention rapidly shifts from one target frequency to another (preferably dwelling on each target frequency for no more than several milliseconds), it creates the same disruptive effect on all target frequencies as you would achieve by simultaneously jamming all the target frequencies at full power.

In addition, the system and method of the present invention is able to dynamically adjust and optimize the jamming signal waveform for each target signal. Thus, rather than simply generating noise at each target frequency, the present invention generates a customized waveform based on the characteristics of the target signal in order to bypass the filters and anti-jamming circuitry in the target receivers. This will be referred to herein as "dynamic modification" of the original target signal.

This dynamic modification does not "blind" the target receiver like a typical jamming signal, but rather allows the jamming signal to bypass the filters and anti-jamming circuitry in the target receivers and creates "false positives" at the target receiver which cause a rapid increase in bit error rates, which in turn causes the frame error rate to increase. This results in the target receiver experiencing dropped packets as well as dropped frames in digital communications systems.

FIG. 1 is a block diagram that illustrates the basic components of a communications jamming system 100, in accordance with one preferred embodiment of the present invention. The system 100 includes a transmit antenna system 110, an RF power amplifier 120, a radio communications system 130, a processing system 140, a user interface 150 and a power source 160.

The transmit antenna system 110 is the primary antenna system for the communications jamming system 100, and can include any antenna known in the art. The antenna system 110 can suitably be a single antenna or any combination of interchangeable, stackable omni-directional and/or directional antennae depending on the jamming application. The antenna system can include, but is not limited to, yagi, omni, fractal and metamaterial antennae. In addition, the antenna system 100 can optionally have the capability to interconnect with other existing antenna systems, such as antennas used in military vehicles.

The RF power amplifier 120 is preferably a selective band RF power that is capable of frequency hopping operation. The RF power amplifier 120 can be either open-loop with the maximum allowable output power or closed-loop digital pre-distortion with variable power control.

The radio communications system 130 is preferably a software defined radio (SDR) system that generates the jamming signal and can be, for example, the model USRP1 Universal Software Peripheral computer-hosted software radio designed and sold by Ettus Research. The USRP1 software radio has an operational frequency range of 50 MHz to 2.2 GHz. However, other daughterboard options achieve an ultra-wideband frequency range from 100 KHz to 4 GHz. Any SDR system 130 may be used while still falling within the scope of the present invention.

The SDR system 130 connects to processing system 140, which acts as a host processor for running the software used to control the SDR system 130. The processing system 140 includes a content management system (CMS) database 145 that contains specifications of known target signals of interest.

The processing system 140 is preferably implemented with a MIL-SPEC ruggedized laptop. However, processing system 140 can also be implemented with a general purpose desktop computer 200 or a general purpose laptop computer 210. In addition, processing system 140 can also be implemented with a special purpose computer, programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of running the software used to control the SDR system 130 can be used to implement processing system 140.

The user interface 150 is preferably a graphical user interface (GUI) that preferably allows for frequency data entry (IF, bandwidth, gain, idle time, step frequencies), displays signal classification and data logging. The user interface will be described in more detail below.

The system 100 can be used in conjunction with a separate frequency scanner 165 that provides information on possible target signals. If a separate frequency scanner 165 is used, the target signal information can be automatically imported directly to the processing system 140 or manually input by an operator via user interface 150. If the scanner 165 is a handheld scanner, the target signal information can be stored on a portable storage medium, such as a flash drive, and then transferred from the portable storage medium to the processing system.

Alternatively, the system 100 can include a receive antenna system 170 for monitoring the RF spectrum and, in conjunction with radio communication system 130 and processing system 140, detecting the presence of target signals. In this configuration, the system 100 incorporates the functionality of a frequency scanner, and separate frequency scanner 165 is not needed.

The CMS database 145 executes the processes necessary to construct the software radio blocks utilized by the SDR system 130, that will be manipulated to generate customized waveforms for jamming signals. Some of the elements of the CMS database 145 that allow for the configuration of software radio blocks include, but are not limited to, utilization of XYZ coordinates, component block connectivity information, functional component blocks that direct the filter, mixer, signal generation, detector used for feedback to sample and validate the cyclical transmissions generations, Radio Frequency Power Amplifier (RFPA) and antenna control, as well as the details of the In-Phase/Quadrature complex data ("IQ data") from lab and field tests.

IQ data embodies the properties of the actual waveform that will be represented by the software defined radio blocks configured to jam the specific target signals. The IQ data is physically synthesized using frequency synthesizers (like direct digital synthesis), and translated and combined with the proper frequencies within a portion of the spectrum. The physical waveform then passes through mixers, filters and eventually the RF power amplifier 120 to the antenna system 110 to be transmitted to jam the target signals.

To execute the processes of building software radio blocks, the CMD database 145 preferably uses device drivers to engage the software elements of the system 100 with the hardware elements by utilizing instructions within the source codes, preferably written in Pythonic, C/C++ and Assembly languages. Cross platform compiling allows for the source code to run on different systemic platforms and for the necessary processes of the different elements of the system 100 to run fluidly.

The physical and non-material elements that engender software radio blocks include component blocks that have: (i) inputs and outputs—the inputs and outputs are not physical inputs and outputs, but rather connections that act as a gateway for information processing; and (ii) processor arrays to manage the processing elements of the system 100. Each individual processor making up the processor arrays preferably has signal processing elements to manipulate IQ data, which is largely the crux of the system's ability to customize jammer signals pursuant to the makeup of the target signal(s) and the cross-referencing of the target signals to the CMS database 145.

Figure 2:
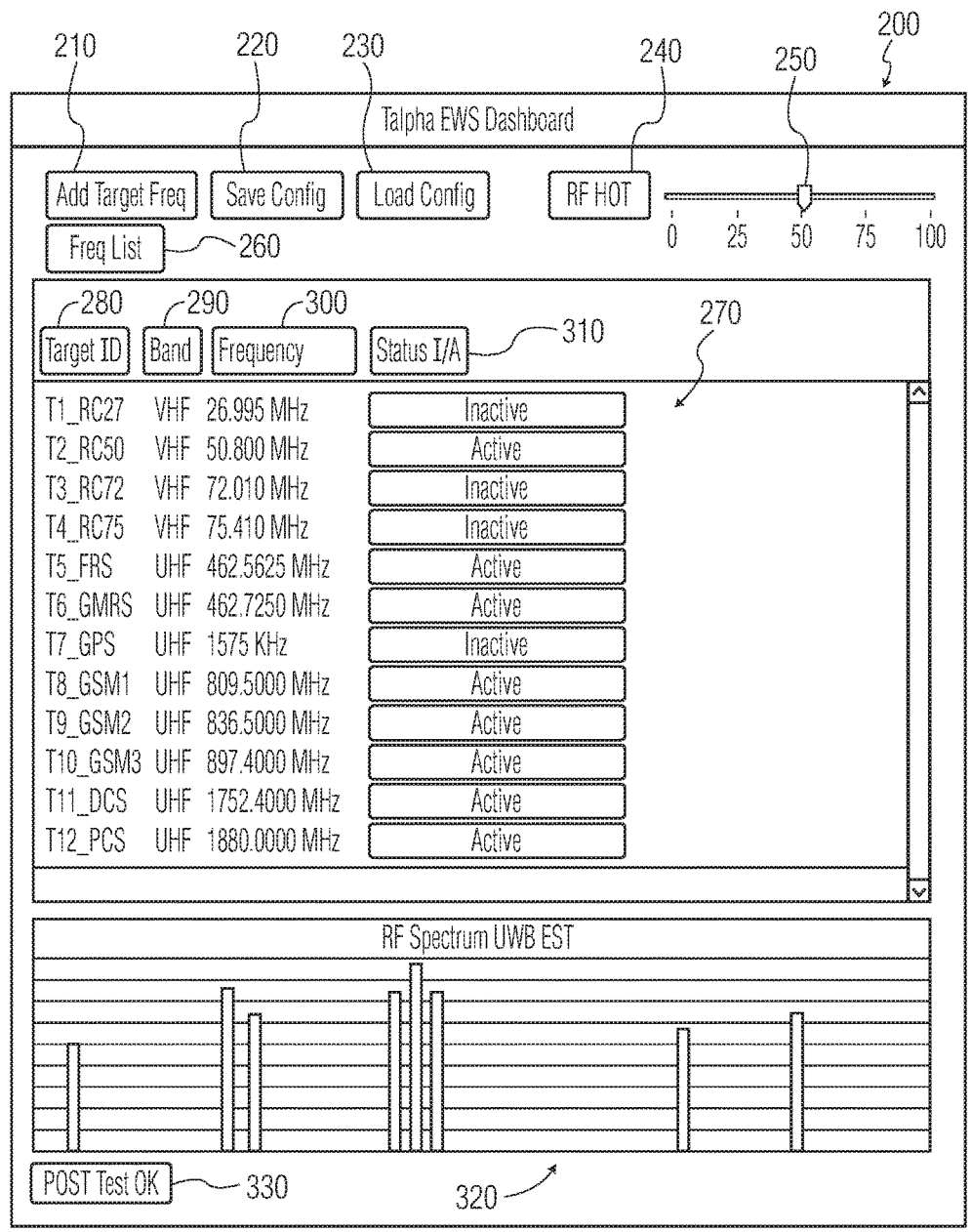
FIG. 2 shows one preferred configuration of the user interface of FIG. 1.

FIG. 2 shows one preferred configuration for the user interface 150. The configuration of FIG. 2 is a GUI 200. The GUI 200 preferably includes the following elements:

"Add Target Frequency" (210)—allows the operator to manually enter target frequencies.

"Save Config" (220)—allows the operator to save the current frequency and user configuration list.

"Load Config" (230)—allows the operator to load a previously saved configuration and frequency list.

"RF Hot" (240)—activates/deactivates the radio communication system 130 RF output switch.

"RF Power Slider" (250)—controls the relative output level of the RF power amplifier 120 from zero to 100%.

"Freq List" (260)—brings up a frequency list window 270 that lists all active and inactive frequencies.

"Target ID" (280)—a column in frequency list window 270 that displays operator defined labels for captured frequencies.

"Band" (290)—a column in frequency list window 270 that displays the band that each frequency falls within "Frequency" (300)—a column in frequency list window 270 that displays the captured frequencies.

"Status I/A" (310)—a column in frequency list window 270 that displays the status of each captured frequency as "Active" or "Inactive".

"RF Spectrum UWB EST" (320)—is a window that displays the approximate RF spectrum currently being jammed.

"POST Test OK" (330)—indicates whether the system passed a power-on-self-test.

Figure 3:
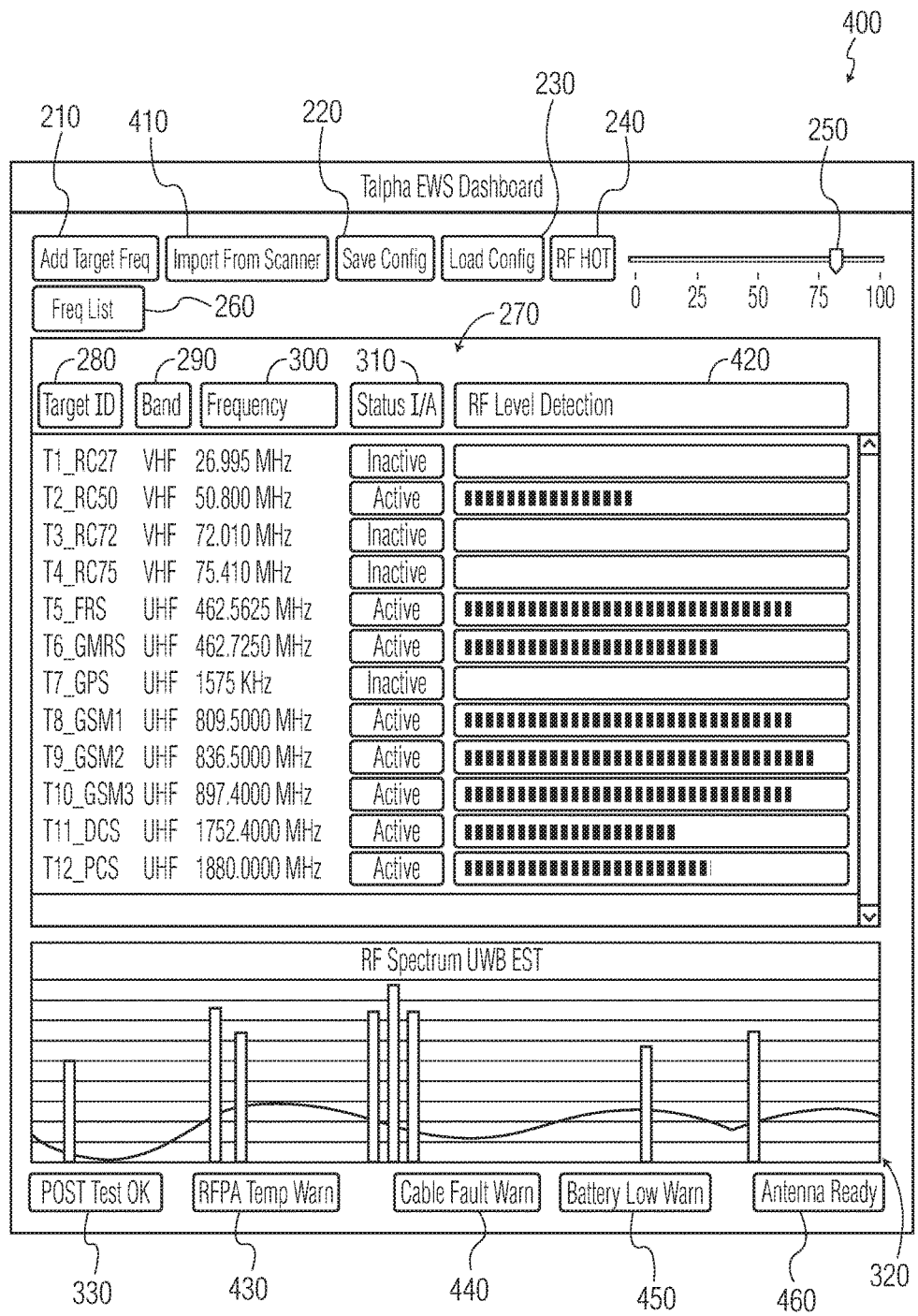
FIG. 3 shows another preferred configuration of the user interface of FIG. 1.

FIG. 3 shows a second preferred configuration for the user interface 150. The configuration of FIG. 3 is a GUI 400. The GUI 400 is similar to the GUI 200 of FIG. 2 and common elements are labeled with common labels and element numbers. However, the GUI 300 of FIG. 3 includes the following additional elements:

"Import From Scanner" (410)—allows the operator to import frequency data from a scanner.

"RF Level Detection" (420)—a column in frequency list window 270 that displays the detected relative RF power level state for each captured frequency as a bar graph.

"RFPA Temp Warn" (430)—an indicator that indicates critical over-temperature status for the RF power amplifier 120.

"Cable Fault Warn" (440)—an indicator that indicates that a transmission cable is shorted or open.

"Battery Low Warn" (450)—an indicator that indicates critically low battery levels.

"Antenna Ready" (460)—an indicator that indicates that the transmit antenna system 110 is ready.

Figure 4:
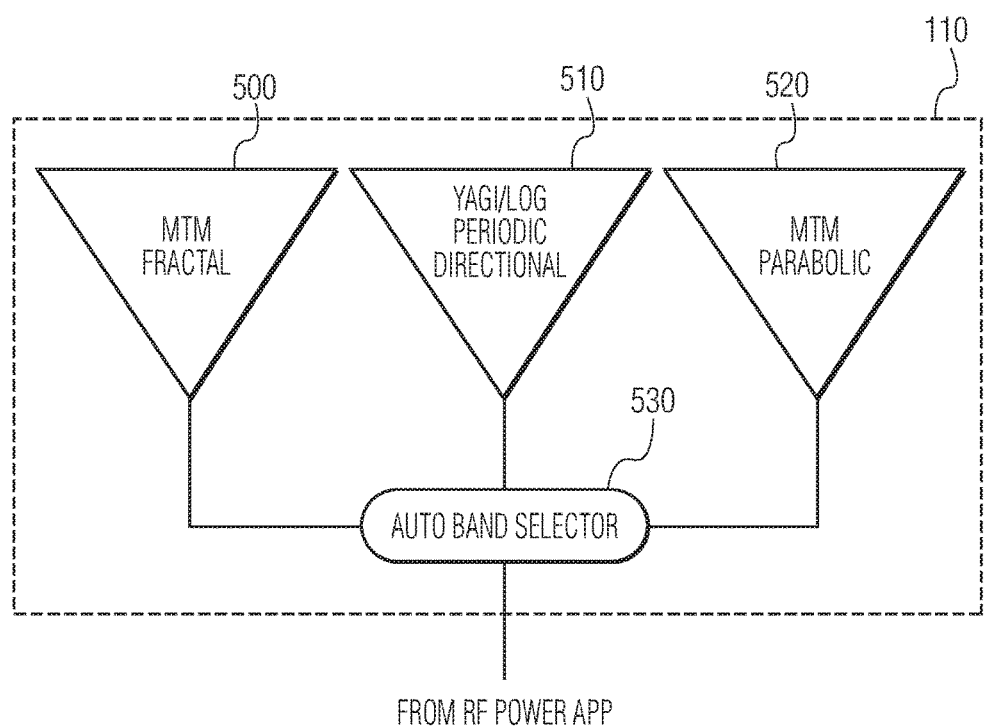
FIG. 4 is a block diagram of one preferred embodiment of the transmit antenna system of FIG. 1.

As discussed above, transmit antenna system 110 can be a combination of interchangeable, stackable omni-directional and/or directional antennas depending on the jamming application. FIG. 4 is a block diagram of one preferred embodiment of the transmit antenna system 110 of FIG. 1, in which multiple types of antenna are used and the system 100 is adapted to automatically switch between the different antenna types.

By way of example, the different types of antenna shown in FIG. 4 are a metamaterial (MTM) fractal antenna 500, a Yagi/Log periodic directional antenna 510 and an MTM parabolic antenna 520. However, it should be appreciated that any number and types of antenna can be used in the transmit antenna system 110 while still falling within the scope of the present invention. The transmit antenna system 110 of FIG. 4 also includes an auto band selector 530 that automatically switches between the multiple antennas 500, 510, 520.

Figure 5:
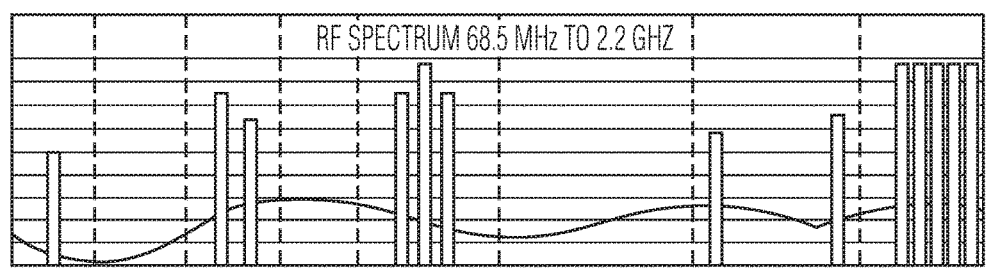
FIG. 5 is a graph illustrating multiple signals of interest over an RF spectrum spanning 68.5 MHz to 2.2 GHz, acquired by the frequency scanner shown in FIG. 1.

FIG. 5 is a graph illustrating multiple signals of interest over an RF spectrum spanning 68.5 MHz to 2.2 GHz, which were acquired by frequency scanner 165. After the signals of interest from the frequency scanner 165 are observed, the operator can decide, based on training, intelligence, previous use, and a compilation of decidedly enemy signals existing on the processor 140, which signals are enemy signals to be targeted by the system 100.

The scanned signals on the battlefield are downloaded into the processing system 140, suitably via a USB or wireless connection. Then, the operator may choose to store the target signals and supplementary information as content in the CMS database 145, which will make them available for lookup on both the processing system 140 and also any network of systems on which the processing system 140 runs.

The CMS database 145 can (but does not do so automatically) cross-reference the target signals with the database of signals' information and properties, as compiled by lab and field tests, to determine the appropriate jamming waveform to be generated to counter the target signals the operator has decided need to be jammed. This operation underlies the crux of the CMS database 145 and the customization and effectiveness of the transmitted jamming signals.

In one embodiment, the system 100 of the present invention takes a portion of the entire spectrum, for example 5 MHZ, and generates jamming signals precisely at each target frequency. Once each designated saturation level has been reached, the band window is tuned to the next set of targets, as fast as a fraction of millisecond. This process repeats numerous times per second and can dynamically change configurations on the fly.

Depending on the situation and use, the processing system 140 can determine the most effective jammer signal for each signal interest. However, this example highlights the malleability in the present invention, where the operator can jam different bands of the RF spectrum, in effect simultaneously, using self-determined jamming signals. The operator is able to decide the jamming signals based on training and combining the known environmental, target signal makeup, distance to target, and other important factors.

One of the primary capabilities of the present invention is the ability to jam multiple targets at multiple specific frequencies at the same time. After the transmit, RF power spectrum parameters, and other data have been set and reached, the jamming of multiple signals at different frequencies by cyclically generating a jamming signal for each target signal occurs.

The transmission of the jammer signals are coordinated to RF spectrum bands over which the target signals fall. The processing system 140 determines the most effective antenna, in the transmit antenna system 110, to use for each target frequency grouped together under given bands of the RF spectrum. After the transmission of the jamming of each target signal or signal(s) under that band occurs, the process will repeat again, given that all of the parameters for a successful jamming transmission have been met. The processing system determines which antenna is currently selected and, if the selected antenna is not correct for the current jamming signal, the processing system 140 will signal to the auto band selector 530 to switch to the appropriate antenna.

The processing system 140 of the system 100 could, for example, continuously and rapidly cycle between jamming a target signal from a GPS device, a target signal from a cell phone and a target signal from a two-way radio. Each time the system 100 switches bands to jam the next band of target signals, it preferably performs ongoing checks and monitors the conditions set forth by the jamming parameters to assure that each jamming signal is successful.

The processing system 140 may then switch from the original target band to the next target band, preferably in a matter of milliseconds, and then to the next target band after a successful jamming has been completed. In this sequence, the processing system 140 will cycle between the different RF Spectrum bands that the target frequencies lie within. This effectively results in the continuous jamming of each target signal for each designated unfriendly system.

The following is a summary of the steps performed by the system 100 for generating jamming signals for multiple target signals, in accordance with one embodiment of the present invention:

(1) Acquire list of designated target frequencies as provided by the operator;

(2) Sort the target frequency list and partition the list into particular band sets;

(3) Determine power amplification requirements for a specific distance;

(4) Pre-calculate effective jammer waveforms, resolve RF power amplifier non-linearities, and apply frequency corrections, dwell delay, and settle time;

(5) Generate In-phase/Quadrature data for the portion of RF band increments;

(6) Load data into buffer, set referenced center frequency, wait for settle time;

(7) Activate multiband multiprotocol jamming waveforms, wait for allocated dwell time;

(8) Prepare next set of target frequencies, once recommended dwell delay is reached, tune to next referenced center frequency; and (9) Repeat step 4 until all the target frequencies in the list are exhausted.

Figure 6:
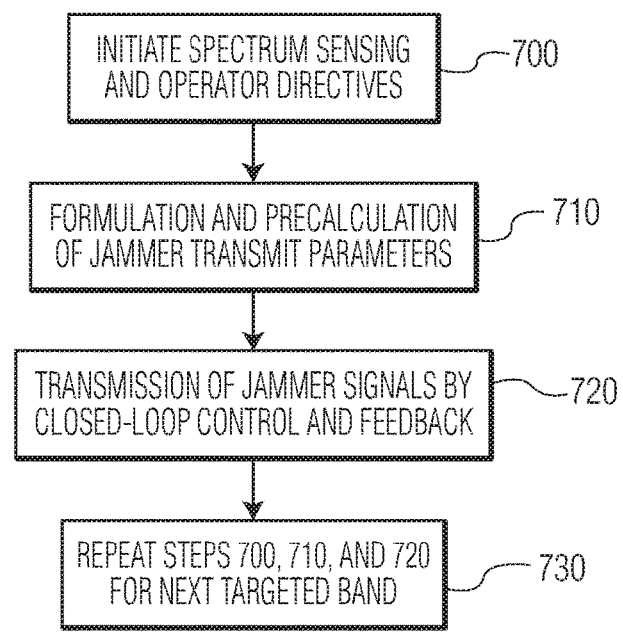
FIG. 6 is a flowchart illustrating steps in the operation of the communications jamming system of FIG. 1, in accordance with an embodiment of the present invention.
Figure 7A:
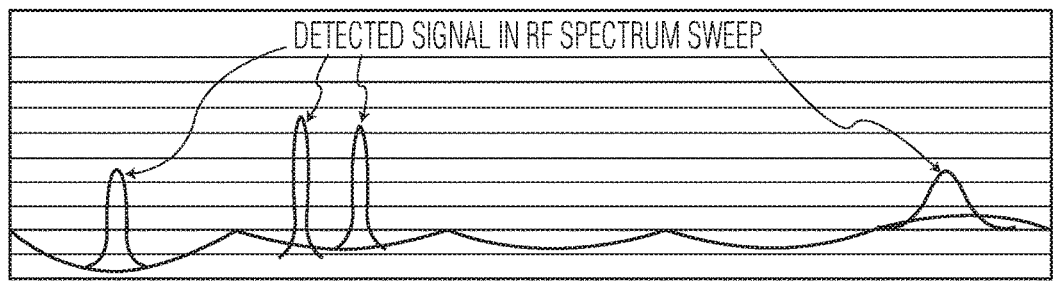
FIG. 7A is a graph of potential target signals gathered in a single ultra-wideband sweep with the frequency scanner shown in FIG. 1, in accordance with an embodiment of the present invention.

FIG. 6 is a flowchart illustrating steps in the operation of the communications jamming system 100 of FIG. 1, in accordance with one embodiment of the present invention. The process starts at step 700, spectrum sensing and operator directives are initiated. With reference to the RF spectrum-sensing graph of FIG. 7A, potential target signals are gathered in a single ultra-wideband sweep with frequency scanner 165. The limitation of the sweep range and quality of data depends on the RF front-end, such as frequency scanner 165, test equipment, antenna system, and filter configuration with sets of dependencies. The dependencies include parameters such as energy detection, receiver sensitivity, frequency range, filters, thermal noise, multipath, clutter, Signal-to-Noise Ratio (SNR) measurements, etc.

As soon as the data is available from the sweep, the processing system 140 loads the target frequency list as prescribed by the operator. The signals of interest are sorted out and grouped by the closest frequency band or operating range. At this time, any operator modification to the target frequency list activates operator parameter change registers referred to as "OP flags".

Figure 7B:
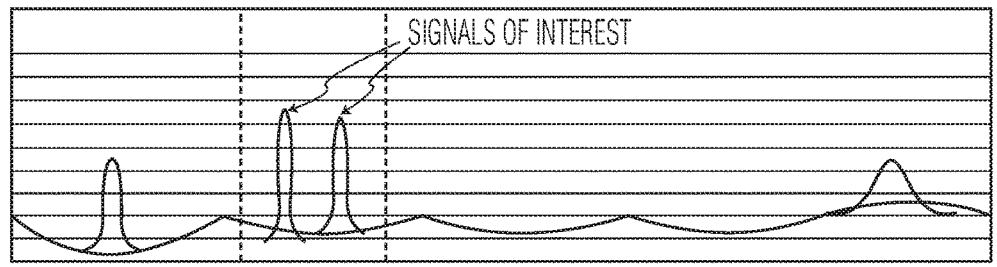
FIG. 7B is a graph showing signals of interest as two peaks with 12.5 KHz channel spacing at the 70 cm or 451-470 MHz frequency band, in accordance with an embodiment of the present invention.

As FIG. 7B illustrates, the signals of interest are two peaks with 12.5 KHz channel spacing at the 70 cm or 451-470 MHz band, which is commonly referred to as the two-way radio GMRS/450 band.

Next, at step 710, formulation and pre-calculations of jammer transmit parameters are carried out. By understanding the given modulation scheme and SNR of each signal of interest, a counter jammer signal for each are formulated. The formulations are based on several parameters including, but not limited to, target frequency, RF gain, waveform, tune delay, settle delay, minimum dwell delay for the waveform period or cycle. Band pass and/or notch filters are automatically incorporated based on the underlying operational knowledge, which is specific for each band. The field measurements are based on real-world data that may be adjusted and dependent on various RF front-end systems and components.

The processing system determines the most effective jammer signal for each signal interest, but the operator can override them if necessary. Most modulation techniques, particularly analog signals, are susceptible to very strong frequency (FM) and amplitude (AM) modulation where the following conditions could be met:

(1) FM jamming where strong jammer signals offset the incoming signal of interest frequency, whereby the receiver RF filters block and/or eliminate it completely. In other words, it "detunes" the incoming signal of interest with enough adjacent channel interferences (ACI) where it becomes out of range of the receiver; and (2) AM jamming where strong jammer signals voltages overload the receiver, causing audio or digital signal distortion—in many cases, where the jammer signals saturates and overloads the receiver.

In another scenario, if the target receiver must lock-on the phase modulation (PM) of the signal interest, a similar strong amplitude modulation jammer signal with longer duration (best case, a continuous wave) disrupts the phase detector in the receiver enough so that it loses sync. Most digital systems are susceptible to this AM/PM method and are usually radio trunking beacons or 2G/2.5G mobile base stations (BTS).

Figure 7C:
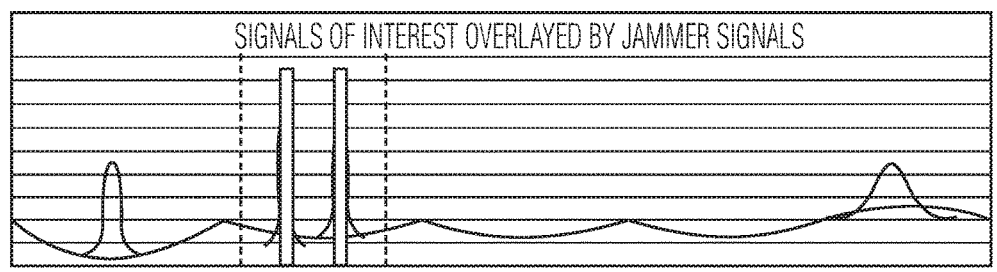
FIG. 7C is a graph showing jammer signals generated over the target frequencies, in accordance with an embodiment of the present invention.

Once all the necessary parameters to generate effective jammer signals are achieved, the transmit circular buffer is filled with the necessary In-phase/Quadrature (IQ) complex data. The IQ data highly depends on the type of waveforms and how many target frequencies are included within a particular targeted band. The jammer signals are generated over the target frequencies, as shown in FIG. 7C.

Figure 7D:
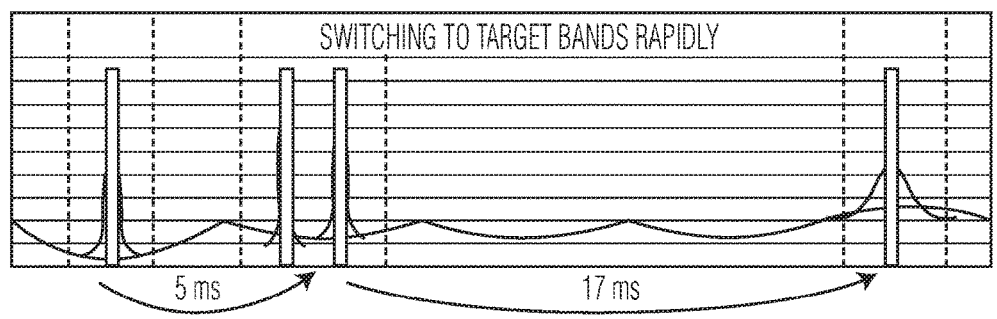
FIG. 7D is a graph showing how the communications jamming system of FIG. 1 switches from one target band to another, in accordance with an embodiment of the present invention.

In step 730, steps 700, 710 and 720 are repeated for the next targeted band. Once the conditions are satisfied for a successful jammer signal transmission, the process repeats again for the next target frequency range or band. The limitations of the system 100 are based on transmitter hardware performance. For typical COTS transmitter hardware, switching to other targeted bands usually takes several milliseconds, while other high-performance hardware can potentially perform in a few milliseconds and below. FIG. 7D provides a visual representation of how the system switches from one target band to another.

Figure 8:
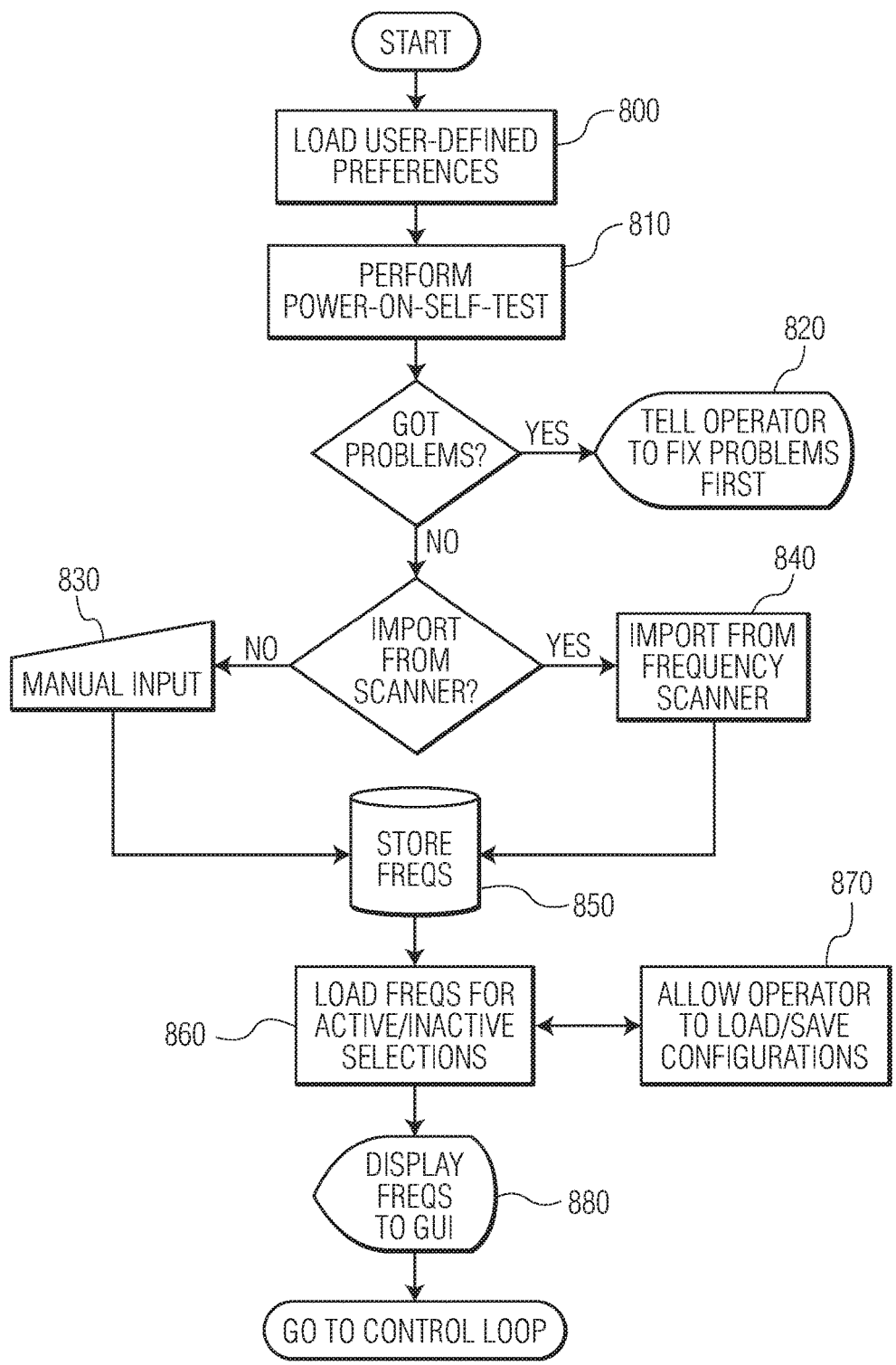
FIG. 8 is a flowchart of preferred steps that the processing system of FIG. 1 performs before and during jamming operations, in accordance with an embodiment of the present invention.

FIG. 8 is a flowchart of preferred steps that the processing system 140 performs before and during jamming operations. At step 800, user-defined preferences are loaded into the processing system 140. These preferences preferably include, but are not limited to, common protocols as determined by previous use, proven functional use from training, etc.

At step 810, the processing system 140 performs a "Power-On-Self-Test" on the system 100 that accompanies other diagnostic operations. The Power-On-Self-Test preferably comprises a brief or comprehensive initialization of all major components or modules of the system 100, and their present ability to interact effectively with each other. If the Power-On-Self-Test discovers a problem or malfunction with one of the programs or components of the system 100, it will cue the operator to fix the problem at step 820 before the sequence of jamming processes continues.

If the Power-On-Self-Test reveals no problems with the system 100, the operator may either input frequencies manually (stemming from gathered or a priori intelligence) at step 830 or import frequency data from the frequency scanner 165 at step 840 to be processed on the CMS database 145.

Regardless of whether the input frequencies are manually entered or imported from frequency scanner 165, the operator may store the frequency data into persistent storage on the CMS database 145.

Then, a frequency list window that lists all active and inactive frequencies will be loaded, a displayed status of captured frequencies as active or inactive will appear on the user interface 150, and the operator will have the opportunity to load frequencies and configurations from before (matched against this active/inactive list) at step 860, or save the frequency list and configurations from the current operator at step 870. After the operator determines the course of action, the list of target frequencies will be displayed on the user interface 150 at step 880. Then, at step 890, the control loop starts.

Figure 9:
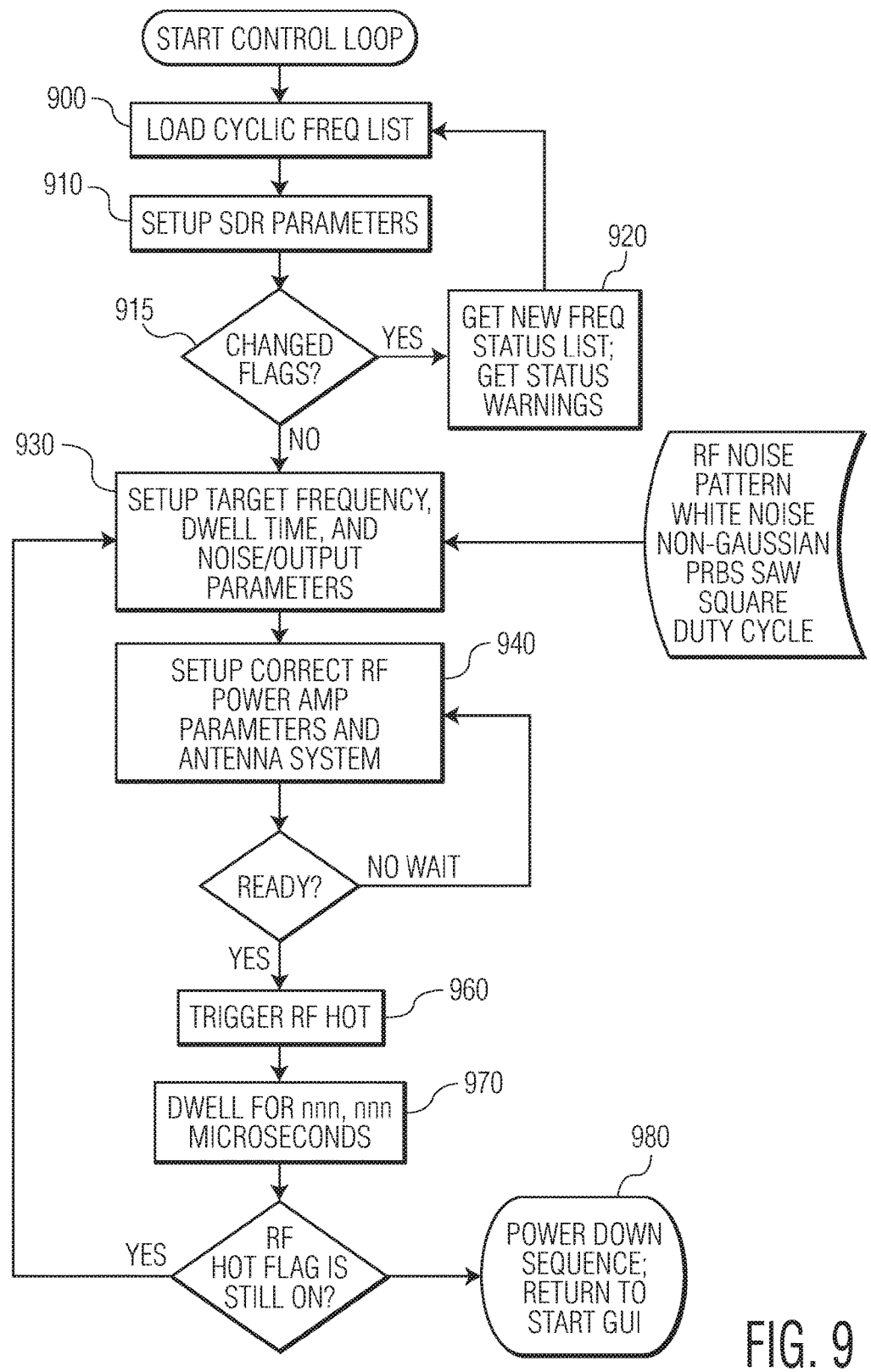
FIG. 9 is a flowchart of preferred steps that the processing system of FIG. 1 performs in connection with the control loop step of FIG. 8, in accordance with an embodiment of the present invention.

FIG. 9 is a flowchart of preferred steps that the processing system 140 performs in connection with the control loop step 880 of FIG. 8. The process starts at step 900, in which the database of active target frequencies are loaded. The frequency data is sorted in both ascending and descending order, with closer channel spacings grouped together, so that the processing system 140 may rapidly cycle through the list to target each frequency with its utmost power before switching to the next frequency.

After the frequency list is loaded and sorted, the transmit SDR parameters are metrically determined at step 910, setting up the requirements for transmission. If the operator manually makes changes to the active frequency list, the cyclical frequency data and the sequence and cyclical jamming meter will likely change. This causes a flagged condition at step 915, which will cause the operator will be prompted, at step 920, with a warning that the change has changed the status of the active cyclical list. If this is the case, the processing system 100 will return to step 900 (Load Cyclic Frequency List) and new SDR parameters will be set at step 910.

If there are no flags at step 915, the target frequency, dwell time for the jammer on particular frequency bands before it switches to the next band, and Noise/Output Parameters for the bands as dictated by lab and field tests (RF Noise Pattern, White Noise, Non-Gaussian random bit signal, PRBS to effectively create noise, SAW filter for delay, Square wave, Duty Cycle to determine the period of activity for the specific output) are setup at step 930.

At step 940, the parameters for the RF power amplifier 120, the type of antenna to be chosen in the antenna system 110 and the bandpass/notch filter characterizations are determined.

At step 950, the processing system 140 determines if the necessary transmit parameters have been met. If so, then the processing system proceeds to step 960. If not, then step 940 will be repeated.

At step 960, the processing system 140 triggers RF output. The processing system 140 will then activate the multiband, multiprotocol jamming waveforms and, at step 970, dwell on each band for a predetermined amount of time. From here, depending on the number of bands and target signals and efficacy of jamming, the processing system 140 will either prepare for the next set of target frequencies and tune to next set of frequencies, looping back to step 930 to set up transmission parameters until the frequency list is exhausted, or the operator overrides the sequence and the system 100 powers down from the control loop at step 980 and returns to step 800 in FIG. 8.

Figure 10:
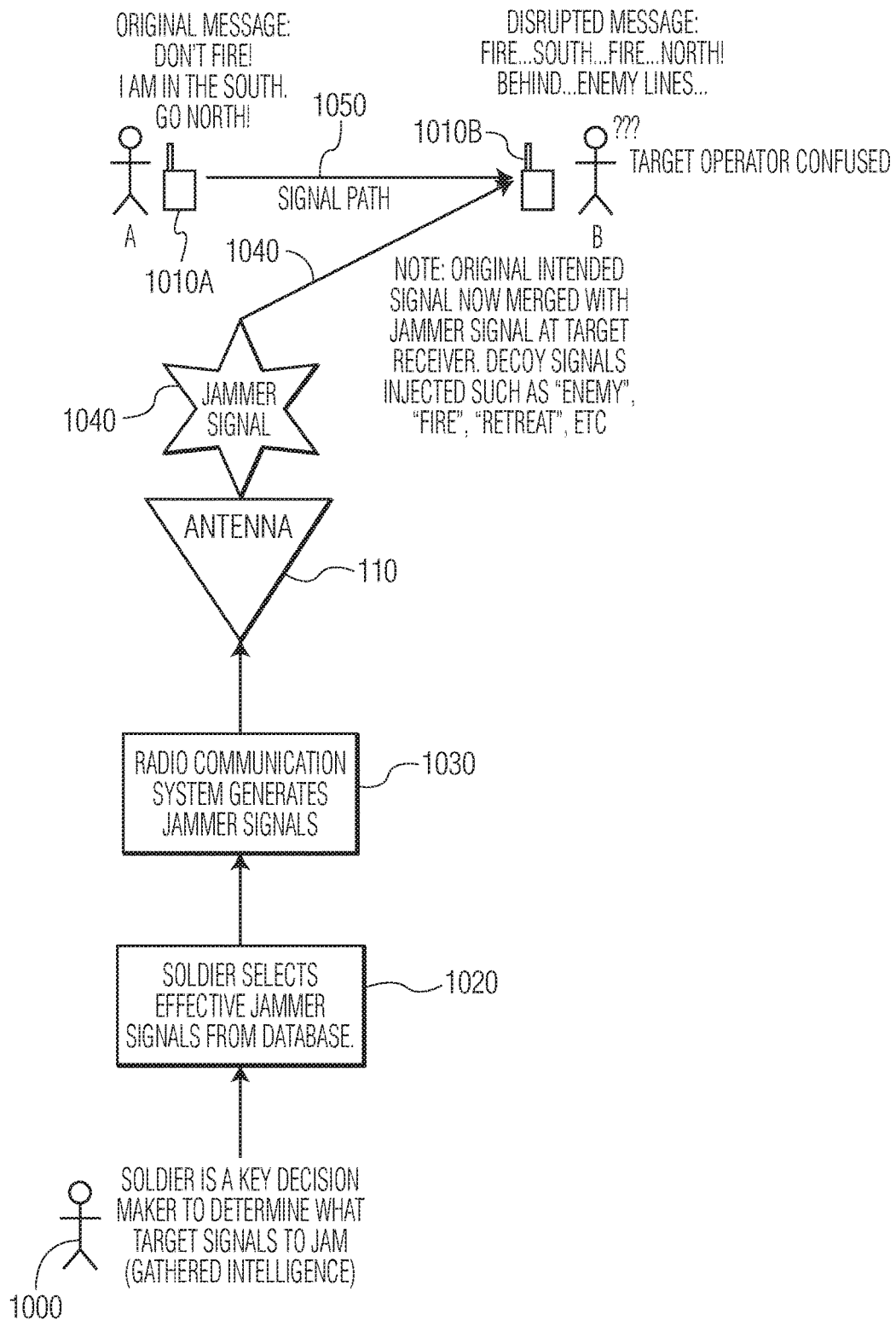
FIG. 10 is a schematic diagram illustrating the operation of the communications jamming system of FIG. 1 in a first hypothetical operational scenario, in accordance with an embodiment of the present invention.

FIG. 10 is a schematic diagram illustrating the operation of system 100 in a first hypothetical operational scenario. In this scenario, the operator 1000 is the key decision maker. In this example, hostile individual "A" and hostile individual "B" are communicating using two-way push-to-talk radios 1010A and 1010B. The operator 1000 uses gathered intelligence to determine which target signals to jam. Input from other operators and general signals intelligence are factors in the decision making process of the friendly operator 1000, given the setting, types of targets, etc.

After inputting the target signals, as dictated by gathered intelligence, into the processing system 140 via the user interface 150, the operator 1000 is able to use his training to assess jammer signals stored in the CMS database 145 (and dictated by either intelligence, self-assessment, previous use, or lab and field tests) against the setting and current target signals. At step 1020, the operator 1000 selects effective jamming signals from the CMS database 145 and initiates RF-hopping jamming sequence. Based on preassessed lab and field measurements and field reports/feedback from operators of other communications jamming systems, the communications jamming system 100 generates optimal and specialized jamming signal waveforms at step 1030.

The physical generation of the SDR blocks, using IQ data, which comprise the customized waveforms is followed by a system self-check process that performs last minute adjustments prior to transmission of jamming signal. The physical waveform is then passed through a number of system components to reach the best antenna in the antenna system 110 (as determined by the auto band selector 530) to be used for the given target signal.

The jamming signal 1040 may then be transmitted to conjoin with the target signal 1050 in its path to the target receiver 1010B. The jamming signal 1040 merges with the target signal 1050 en route to the target receiver 1010B and, due to the customized waveform generated by the communications jamming system 100, does not blind the target receiver 1010B. Instead, the jamming signal 1040 unobtrusively dynamically modifies the target signal 1050 to generate a decoy signal intended to confuse hostile individual B listening with target receiver 1010B.

In this hypothetical scenario, the original signal 1050 read, "Don't fire! I am in the South! Go North!" The signal that was received by the target receiver 1010B, after dynamic modification and because of the customized waveform generated from the communications jamming system 100, was heard by hostile individual B as "F-re . . . in . . . sout . . . orth."

Figure 11:
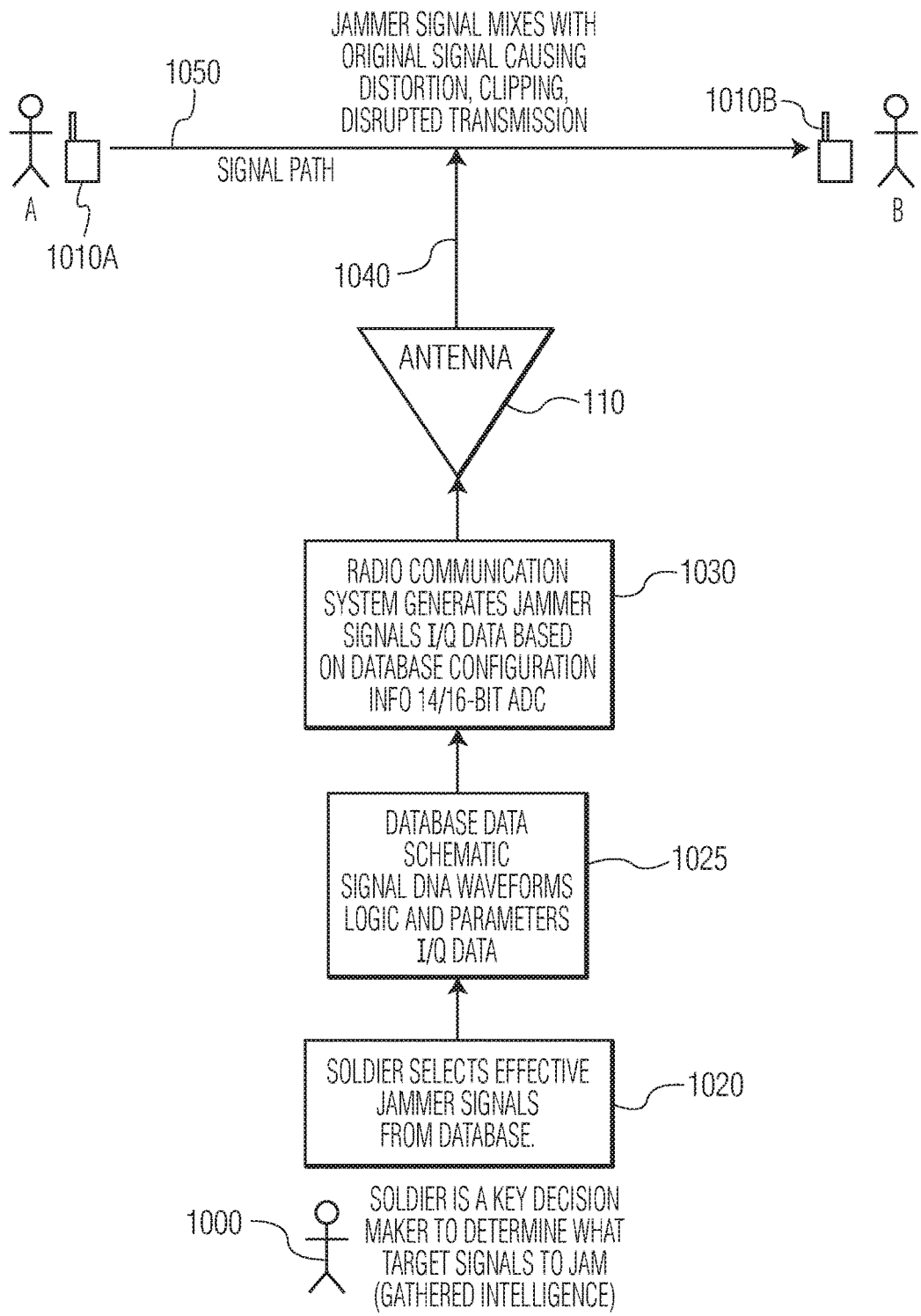
FIG. 11 is a schematic diagram illustrating the operation of the communications jamming system of FIG. 1 in a second hypothetical operational scenario, in accordance with an embodiment of the present invention.

FIG. 11 is a schematic diagram illustrating the operation of system 100 in a second hypothetical operational scenario. Hostile individuals A and B are again communicating using two-way push-to-talk radios 1010A and 1010B, respectively. As in the scenario of FIG. 10, the operator 1000 gathers and enters the relevant target signals to jam based on gathered intelligence, and uses the same processes as described in FIG. 10 to determine the effective jammer signals from the CMS database 145.

Step 1025 refers to the process of the CMS database 145 configuring the software radio block components to operate according to different target signal waveforms and to work in tandem with other system components to generate the custom jamming signal 1040. The processing system 140 cues the IQ data for the specified jamming signal information inside of the CMS database 145 for targeted signals, as identified and confirmed by the operator 1000 at step 1020.

The CMS database 145 contains myriad components that allow for software radio blocks to be constructed. These components enable the crux of the information generation and processing that is later to be synthesized into jamming waveforms.

After the IQ data (frequency, waveform type, dwell time, power, etc) is read, the system 100 activates a series of automated processes and system configurations as instructed by the data logic and sets various parameters, such as SDR, target frequency, dwell time, noise/output, RF power amplifier, antenna, etc. (steps 930 and 940 in FIG. 9) that set the groundwork for the software defined radio component blocks to be constructed. From here, the makeup of the waveforms to be constructed is signaled to the schematic and database elements of the system 100.

At step 1030, the signal processing elements of the component blocks then manipulate the data for each of the target signals that are to become the actual jammer waveform, using IQ data and modulation techniques, preferably generated using $^{14}\!/_{16}$ bit AD converters and stored as binary large objects (BLOBs) in the database. Once the jammer waveform is physically synthesized, translated, and combined with the proper frequencies in the correct portion of the spectrum, the waveform will pass through mixers, filters, and the RF power amplifier 120 to the antenna system 110 (if the parameters and self-system checks have been passed) to transmit the generated waveform 1040.

In hypothetical of FIG. 11, hostile individual A has generated a transmission to hostile individual B, and the jamming signal 1040 merges with the target signal 1050 to cause distortion, clipping, and an otherwise disrupted transmission. Here, as opposed to the hypothetical of FIG. 10, the customized jamming signal 1040 alters the intended transmission of the target signal 1050 just enough to make it unintelligible, not to relay decoy signals to the target receiver 1010B.

Figure 12:
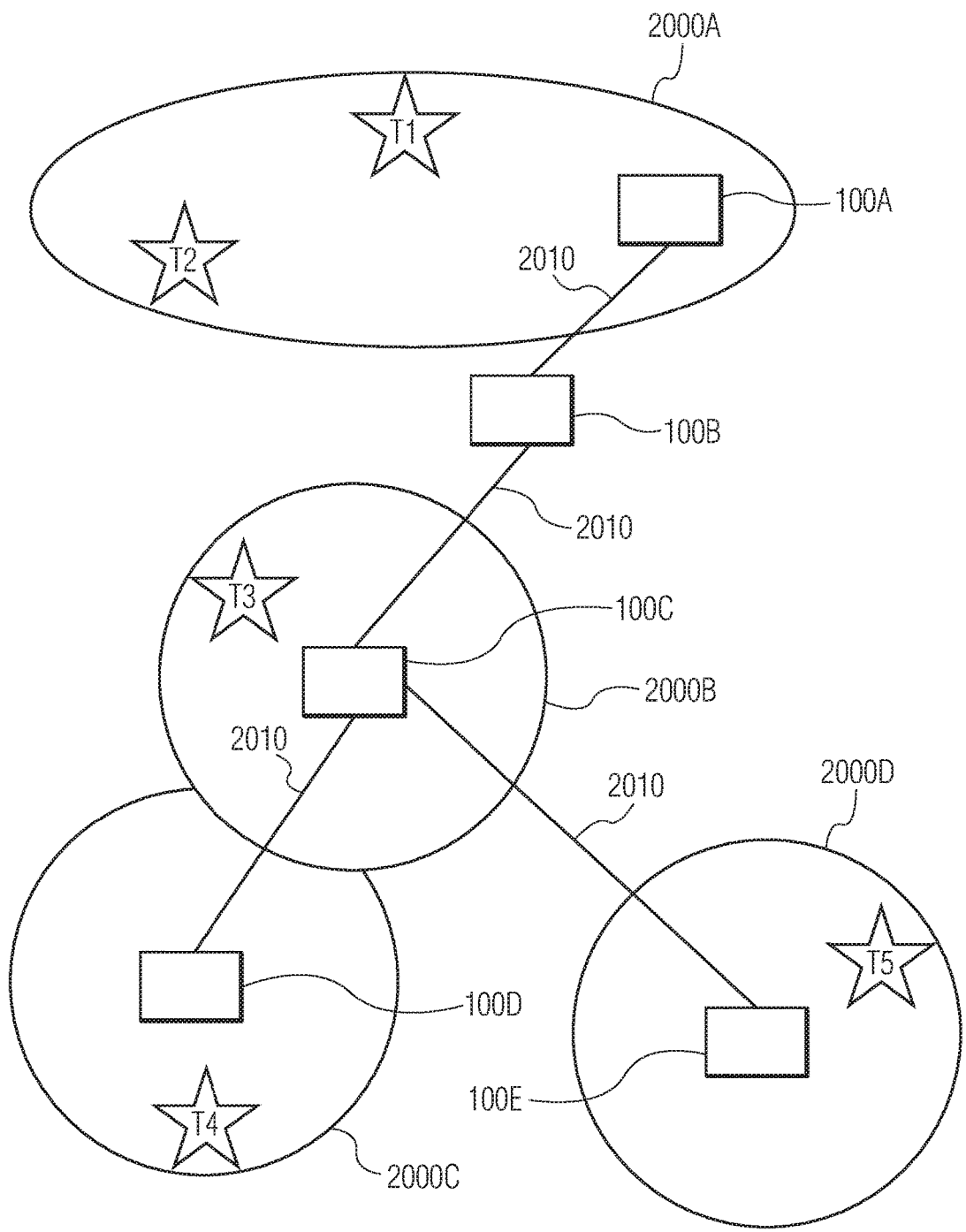
FIG. 12 is a schematic diagram illustrating how a mesh-jamming network (MJN) can be created and deployed using the communications jamming system 100 of the present invention.

FIG. 12 is a schematic diagram illustrating how a mesh-jamming network (MJN) can be created and deployed using the communications jamming system 100 of the present invention. In FIG. 12, the "star" shapes labeled T1, T2, T3, T4 and T5 represent targets, such as hostile two-way radios and/or other hostile transceivers including, but not limited to, radio-controlled-based devices.

The rectangle shapes marked 100A, 100B, 100C, 100D and 100E represent multiple communications jamming systems 100 (FIG. 1) arranged at different geographic locations. The circle or ellipse shapes marked 2000A, 2000B, 2000C and 2000D represent the jamming coverage areas of communications jamming systems 100A, 100C, 100D and 100D, respectively.

Communications jamming system 100B is not surrounded by a circle or ellipse because it is not actively jamming any targets. However, communications jamming system 100B does relay active communications jamming system elements, protocols and other relevant field intelligence to other communications jamming systems in the area. The solid black lines 2010 represent radio-frequency links between communications jamming systems 100A-100E. The radio-frequency links 2010 are preferably coded orthogonal frequency-division multiplexing (OFDM)-type of protocol communication that allows communication jamming systems 100A-100E to dynamically and intelligently coordinate communications jamming coverage.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

What is claimed is:

1. A method of jamming a communications signal, comprising:
   (a) detecting potential target signals over an RF spectrum;
   (b) comparing the potential target signals to target signals of interest contained in a content management system (CMS) database, wherein the CMS database also contains jamming signal parameters associated with each target signal of interest;
   (c) determining which of the potential targets signals are hostile target signals based, at least in part, on the comparison performed in step (b);
   (d) determining jamming signal parameters for a first hostile target signal at a first frequency;
   (e) generating a jamming signal for the first hostile target signal at the first frequency using a software defined radio (SDR) system, wherein the jamming signal incorporates the determined jamming signal parameters;
   (f) transmitting the jamming signal; and
   (g) generating and transmitting subsequent jamming signals for hostile target signals at other frequencies in a sequential manner in accordance with steps (b)-(f) until jamming signals have been generated and transmitted for all hostile target signals;
   wherein each jamming signal is transmitted for a predetermined period of time ("dwell time").

2. The method of claim 1, wherein the jamming signals comprise frequency modulated, phase modulated and/or amplitude modulated jamming signals.

3. The method of claim 1, wherein the jamming signal parameters are determined by a human operator.

4. The method of claim 1, wherein the maximum output power of the SDR system is used to transmit each individual jamming signal.

5. The method of claim 1, wherein the dwell time is not greater than 3 milliseconds.

* * * * *